United States Patent
Martin et al.

(10) Patent No.: US 9,876,219 B2
(45) Date of Patent: Jan. 23, 2018

(54) METHOD FOR PERFORMING ENRICHMENT OF AN ELECTRODE OF AN ELECTROCHEMICAL DEVICE WITH IONIC SPECIES

(71) Applicant: COMMISSARIAT À L'ENERGIE ATOMIQUE ET AUX ENERGIES ALTERNATIVES, Paris (FR)

(72) Inventors: Steve Martin, Saint-Sauveur (FR); Hélène Porthault, Echirolles (FR); Sylvain Poulet, Fontaine (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 227 days.

(21) Appl. No.: 14/951,061

(22) Filed: Nov. 24, 2015

(65) Prior Publication Data
US 2016/0149203 A1    May 26, 2016

(30) Foreign Application Priority Data
Nov. 24, 2014   (FR) ..................................... 14 61380

(51) Int. Cl.
*H01M 4/13*    (2010.01)
*H01M 4/04*    (2006.01)
(Continued)

(52) U.S. Cl.
CPC .......... *H01M 4/0459* (2013.01); *G02F 1/155* (2013.01); *H01M 4/0452* (2013.01);
(Continued)

(58) Field of Classification Search
CPC ... G02F 1/155; H01M 10/052; H01M 4/0452; H01M 4/0459; H01M 4/0461;
(Continued)

(56) References Cited

U.S. PATENT DOCUMENTS 5,558,953 A    9/1996   Matsui et al.
2014/0308571 A1*  10/2014  Gaben ............... H01M 10/0562
                                                429/162

FOREIGN PATENT DOCUMENTS

EP    2 320 502 A1    5/2011
FR    2 873 854 A1    2/2006
(Continued)

OTHER PUBLICATIONS

Shirpour, Mona et al., "New materials based on a layered sodium titanate for dual electrochemical Na and Li intercalation systems", Energy & Environmental Science, 2013, vol. 6, pp. 2538-2547.

*Primary Examiner* — Ula C Ruddock
*Assistant Examiner* — Ben Lewis
(74) *Attorney, Agent, or Firm* — Oliff PLC (57) ABSTRACT

Method for an electrochemical device electrode enrichment, with ionic-species, including steps of: providing a substrate with at least one stack including: a first current-collector covering at least part of the substrate, first electrode covering at least part of the first current-collector, the first electrode being in electric contact with the first current-collector, protective layer totally covering the first electrode and at least part of the first current-collector, the protective layer being electrically insulating and ionically conducting; immersing in an electrolytic solution: the substrate provided with stack, counter-electrode made from conducting material, the electrolytic solution including at least one ionic-species salt and/or counter-electrode including ionic-species, applying electric voltage or current, with voltage or current generator, between first current-collector and counter-electrode making the ionic-species migrate to the first electrode and enrich the first electrode with ionic-species, depositing a second electrode on the protective layer after enrichment of the first electrode with ionic-species.

17 Claims, 4 Drawing Sheets

(51) Int. Cl.
    *G02F 1/155*     (2006.01)
    *H01M 4/131*     (2010.01)
    *H01M 4/1391*    (2010.01)
    *H01M 10/052*    (2010.01)
    *H01M 4/139*     (2010.01)
    *H01M 4/38*      (2006.01)

(52) U.S. Cl.
    CPC ........... *H01M 4/0461* (2013.01); *H01M 4/13* (2013.01); *H01M 4/131* (2013.01); *H01M 4/139* (2013.01); *H01M 4/1391* (2013.01); *H01M 10/052* (2013.01); *H01M 4/381* (2013.01); *H01M 4/382* (2013.01)

(58) Field of Classification Search
    CPC ........ H01M 4/13; H01M 4/131; H01M 4/139; H01M 4/1391; H01M 4/381; H01M 4/382
    See application file for complete search history.

(56) References Cited

FOREIGN PATENT DOCUMENTS

| | | |
|---|---|---|
| JP | S62-226563 A | 10/1987 |
| WO | 99/43034 A1 | 8/1999 |
| WO | 2014/017968 A1 | 1/2014 |

\* cited by examiner

METHOD FOR PERFORMING ENRICHMENT OF AN ELECTRODE OF AN ELECTROCHEMICAL DEVICE WITH IONIC SPECIES

BACKGROUND OF THE INVENTION

The invention relates to a method for performing enrichment of an electrode of an electrochemical device with ionic species and also relates to an electrode obtained in this manner.

STATE OF THE ART

"All solid" microbatteries are batteries with components (current collectors, positive electrode and negative electrode, electrolyte) in the form of a stack of thin layers. The active stack presents a thickness of about 10 to 15 µm.

Figure 1:
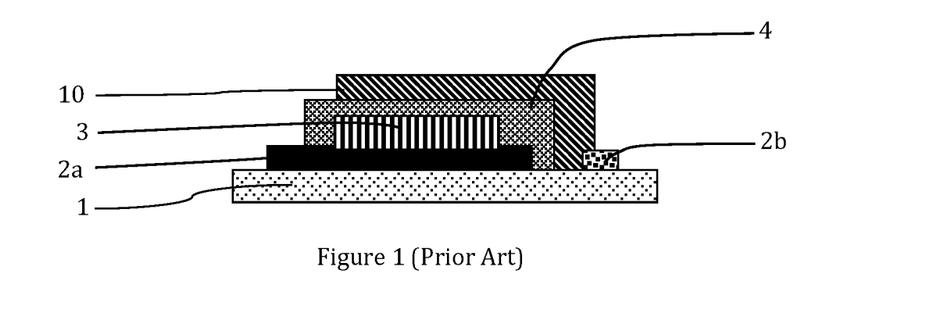
FIG. 1 represents an electrochemical device according to the prior art, in schematic manner, in cross-section.

These microbatteries are conventionally produced by successively depositing on a substrate 1 at least (FIG. 1):
- a cathodic current collector 2a and a cathodic current collector 2b,
- a positive electrode or cathode 3, the positive electrode being deposited on the cathodic current collector 2b,
- a solid electrolyte 4, the solid electrolyte 4 completely covering the cathode 3, but not completely covering the cathodic collector 2a,
- a negative electrode or anode 10, the negative electrode being in contact with the anodic collector 2b.

The thin layers are generally fabricated by vacuum deposition techniques of physical vapor deposition (PVD) or chemical vapor deposition (CVD) type or by thermal evaporation depending on the nature of the materials that compose them.

The operating principle of these microbatteries is based on insertion and extraction of ions of an alkaline metal or of protons in the positive electrode. Most microbatteries currently use lithium ions originating from one of the materials forming the electrodes as ionic species.

Generally, the lithium ions originate either from a metallic lithium electrode (case of microbatteries called "lithium-metal" microbatteries), or from an electrode formed by a lithiated insertion material such as for example a mixed cobalt/lithium, nickel/lithium or manganese/lithium oxide (case of microbatteries referred to as "lithium-ion" microbatteries).

The melting point of lithium being 181° C., metallic lithium electrodes cannot be used in microbatteries at high temperatures.

Lithiated insertion materials of mixed oxide type do however require thermal annealing at a temperature of at least 600° C. to enhance crystallisation and to improve the reversibility of cycling of the lithium ions in the material. Such an annealing is however incompatible with certain technologies such as the technology called "Above-IC" the purpose of which is to place the microbatteries at the top part of the integrated circuits which cannot withstand such temperatures.

In order to palliate these shortcomings, the document FR 2,873,854 proposes to fabricate an electrode made from lithiated material, implementation of which does not require annealing at temperatures exceeding 300° C.

An electrode made from non-lithiated material, for example $TiS_2$, is subjected to an in situ lithiation step. For this, one or more layers of non-lithiated material are associated with one or more layers of lithium. As lithium intends to diffuse into the non-lithiated electrode material, electrodes made from lithiated material are obtained.

However, to obtain a homogenous composition, it is necessary to foster diffusion of the lithium by heat treatment in an inert atmosphere at temperatures of about 100° C.-300° C. and/or to multiply the number of material/lithium layers. In addition, as metallic lithium is very reactive to the environment, the electrode has to be encapsulated in a material to protect it from the surrounding and, in particular from humidity. The last layer has to be a layer of non-lithiated material to prevent the lithium from reacting with the outside environment.

The document EP 2,320,502 proposes to perform lithiation of the non-lithiated electrode material by short-circuiting the electrodes of the battery.

To perform lithiation, the following layers are deposited on a substrate:
- a first electrode (cathode) made from titanium oxysulfide TiOS,
- a solid electrolyte made from LIPON,
- a second electrode (anode) made from germanium or silicon.

The two electrodes formed in this way are short-circuited. Lithium is then deposited on the anode. The anode material then becomes conducting under the influence of the lithium and the battery starts operating on short-circuit. The lithium present in the anode diffuses through the electrolyte to the cathode where it is inserted in the cathode material. The short-circuit is maintained until complete evaporation of the lithium. The lithium ions are mainly located in the cathode layer.

However, short-circuiting of the battery can cause rapid and uncontrollable diffusion of the lithium ions, which is liable to give rise to localised excess lithiation phenomena and/or degradation of the electrodes/electrolyte interfaces.

OBJECT OF THE INVENTION

The object of the invention is to remedy the shortcomings of the prior art, and in particular to propose a method for performing enrichment of an electrode of an electrochemical device that is simple and easy to implement, and that enables homogenous electrodes of good quality to be obtained.

This object tends to be achieved by the appended claims.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF A PREFERRED EMBODIMENT OF THE INVENTION

The method for performing enrichment of an electrode with ionic species can be used for different types of electrochemical device.

Preferentially, it is used to enrich an electrode of a battery, a microbattery or an electrochromic system.

Figure 2:
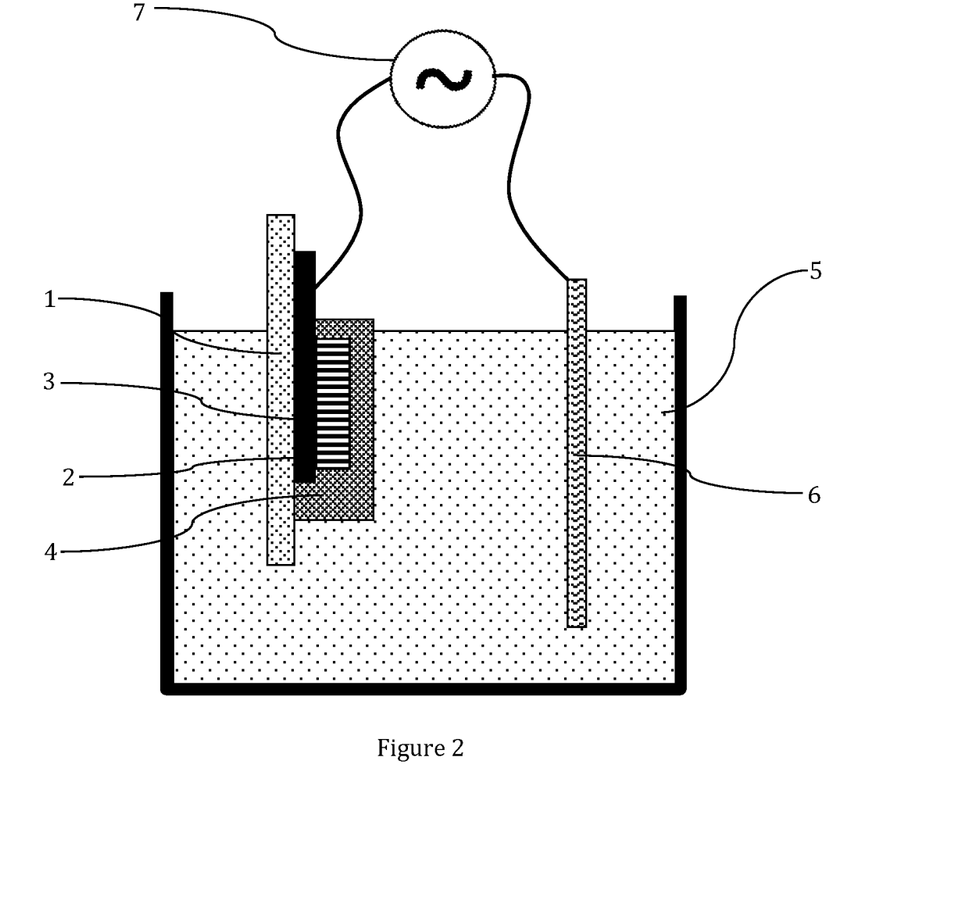
FIG. 2 represents a step of the method for performing enrichment of an electrode of an electrochemical device according to the invention, in schematic manner, in cross-section.

As represented in FIG. 2, the substrate 1 used for the enrichment method is provided with at least one stack comprising:
- a first current collector 2 covering at least a part of the substrate 1,
- a first electrode 3 covering at least a part of the first collector 2, the first electrode 3 being in electric contact with the first current collector 2, said electrode 3 being designed to be enriched with an ionic species,
- a protective layer 4 totally covering the first electrode 3 and at least a part of the first current collector 2, the protective layer 4 being electrically insulating and ionically conducting.

The substrate 1 provided with the stack is immersed in an electrolytic solution 5. Preferably, the part of the first current collector 2 not covered by the protective layer 4 is kept outside the electrolytic solution 5, i.e. only the part of the current collector 2 covered by the protective layer 4 is immersed in the solution 5. This avoids deposition of the ionic species on the first current collector 2.

Preferentially, the substrate 1 is an electrically insulating substrate to prevent deposition of the ionic species on the substrate. What is meant by electrically insulating is that it is made from an electrically insulating material or that it is made from electrically conducting material and covered by an electrically insulating layer.

A counter-electrode 6 is also immersed in the electrolytic solution 5.

To enrich the first electrode 3 with ionic species, the electrolytic solution 5 comprises at least one salt of the ionic species and/or the counter-electrode comprises said ionic species.

The ionic species originate either from the electrolytic solution 5 only, or from the electrolytic solution 5 and the counter-electrode 6, or from the counter-electrode 6 only.

The electrolytic solution 5 can comprise several salts of the ionic species.

Preferentially, the electrolytic solution 5 comprises at least one carbonate solvent and at least one salt of the ionic species.

What is meant by carbonate is a compound comprising a group comprising a carbon atom bonded to three oxygen atoms ($CO_3^{2-}$).

Propylene carbonate (PC), dimethyl carbonate (DMC), ethylene carbonate (EC) and diethylene carbonate (DEC) are for example carbonate solvents. These solvents have given good results.

A carbonate solvent or a mixture of several carbonate solvents can be used to form the electrolytic solution.

In the case of a lithiation, the salt of the ionic species is for example a lithium salt of $LiPF_6$ type. This type of ionic salt advantageously ensures a good ionic conductivity of the $Li^+$ ions.

The counter-electrode 6, immersed in the electrolytic solution 5, is made from an electrically conducting material.

An electric voltage or current is applied between the first current collector 2 and the counter-electrode 6 so as to make the ionic species migrate from the electrolytic solution 5 and/or from the counter-electrode 6 to the first electrode 3 and to enrich the first electrode 3 with ionic species.

The ionic species diffuses through the ionically conducting protective layer 4.

The counter-electrode 6 can be a source of the ionic species.

The counter-electrode 6 is advantageously made from electrically conducting material comprising said ionic species.

The ionic species is, according to one embodiment, an alkaline ionic species—the counter-electrode 6 is made from an alkaline metal base.

Preferentially, the counter-electrode 6 is made from lithium, sodium or potassium. The ionic species which will be inserted in the first electrode 3 respectively corresponds to lithium ions, sodium ions or potassium ions.

According to another embodiment, the ionic species is a non-alkaline ionic species. The counter-electrode 6 is in this case for example made from copper.

The electric voltage or current applied between the first current collector 2 and counter-electrode 6 enables the ionic species to migrate from the counter-electrode 6 to the first electrode 3 and to enrich the first electrode 3 with ionic species.

The electric voltage or current is applied by means of an electric voltage or current generator 7.

Flow of each electron, supplied by the generator 7, corresponds to insertion of an ion in the first electrode 3.

This method enables the insertion kinetics of the ionic species and the quantity of ionic species inserted into the electrode material to be controlled, by choosing the current or voltage applied and the duration of the electrochemical treatment.

The current densities are less than 100 $mA/cm^2$. Advantageously, they are less than 1 $mA/cm^2$.

The voltage applied will be chosen by the person skilled in the art according to the electrode materials. Advantageously it will be less than 5V.

The duration of the enrichment step is advantageously less than 1 h. It depends on the current and the thickness of the electrode.

The enrichment is homogenous over the whole of the electrode material and the surface state is not impaired.

In the case of enrichment with lithium ions, i.e. in the case of a lithiation, localised excess lithiation phenomena are avoided. The obtained electrode is homogenous and presents good electrochemical performances.

The applicant observed, contrary to all expectations, that the lithiation method of an electrode material by electrochemical means in solution is particularly suitable for thin layer devices (microbatteries and electrochromic systems).

This kind of method in solution is in fact normally not recommended for these devices in so far as direct immersion of the devices in a liquid solution would have the consequence of absorption of the electrolyte solution in the porosities of the electrode material. Therefore, at the end of the lithiation process, the electrode will be irremediably soiled by residues of the electrolyte solution, which will make the subsequent steps of fabricating the microbattery impossible and/or will reduce the performances of the electrochemical device.

Moreover, in the case of the applicant's method, the enrichment step is performed through the protective layer, which enables absorption of molecules on the electrode material to be avoided.

Preferentially, the first electrode 3 is made from non-lithiated material. The non-lithiated material is preferably chosen from vanadium oxide ($V_xO_y$), tungsten oxide ($WO_x$), or molybdenum oxide ($MoO_x$). The non-lithiated material can further be a titanium oxysulfide ($TiO_xS_y$).

Even more preferentially, the first electrode 3 is made from TiOS, silicon, germanium, graphite, indium, tin or $V_2O_5$.

Preferentially, the protective layer 4 advantageously corresponds to the solid electrolyte layer of the microbattery or of the electrochromic system. It is not necessary to remove the protective layer after enrichment of the first electrode 3. The second electrode 10 can be deposited directly on the protective layer 4.

The solid electrolyte can be made from lithium boron oxynitride (LiBON), lithium silicon phosphorous oxynitride (LiSiPON), etc. In preferential manner, the solid electrolyte is made from lithium phosphorus oxynitride (LiPON) called LIPON. LIPON is a good ionic conductor.

The solid electrolyte can also be made from $Li_2S$—$P_2S_5$.

It is commonly accepted by the person skilled in the art that the state of the interfaces between the electrodes and the electrolyte is a major factor controlling the performances of the battery.

The electrochemical lithiation step through the solid electrolyte layer is not in principle recommended.

However, contrary to expectations, the applicant observed that the enrichment method by electrochemical means does not impair, or hardly impairs, the surface of the solid electrolyte in contact with the bath. Conservation of the surface state of the solid electrolyte is also attributed to limitation of the natural oxidisation of this surface by the input of the ions at the origin of the enrichment method with ionic species.

Figure 3:
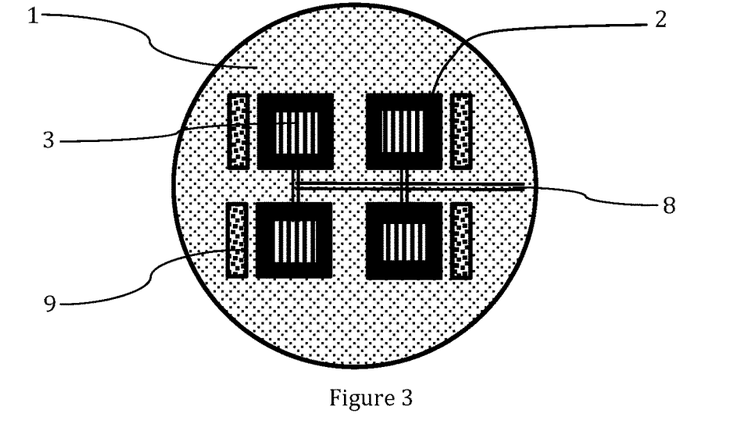
FIGS. 3 to 7 represent an electrochemical device at different steps of the method according to the invention, in schematic manner, in top view.

As represented in FIG. 3, according to a preferred embodiment, an electrically conducting track 8 is deposited on the substrate 1.

The track 8 is electrically connected to the first current collector 2. The track 8 is advantageously formed before deposition of the first electrode 3 and/or before deposition of the first current collector.

The electrically conducting track 8 is preferentially made from copper or from titanium. Copper is advantageously a good electric conductor and presents low production costs.

In general manner, the track 8 is made from an electrically conducting material that is not able to combine with the ionic species to be transferred.

Preferentially, a second current collector 9 is also deposited on the substrate 1.

The second current collector 9 is electrically dissociated from the first current collector 2.

Conventionally, the current collectors 2, 9 are formed by metal layers, for example made from platinum, chromium, gold, titanium, etc.

The protective layer 4 is deposited so as to encapsulate the first electrode 3.

In a preferential embodiment, the protective layer 4 is deposited on the substrate so as to totally cover both the first electrode 3, first current collector 2 and second current collector 9.

In this configuration, the electric voltage or current generator 7 is connected to the electrically conducting track 8 and to the counter-electrode 6 so as to enable lithiation of the first electrode 3.

Figure 4:
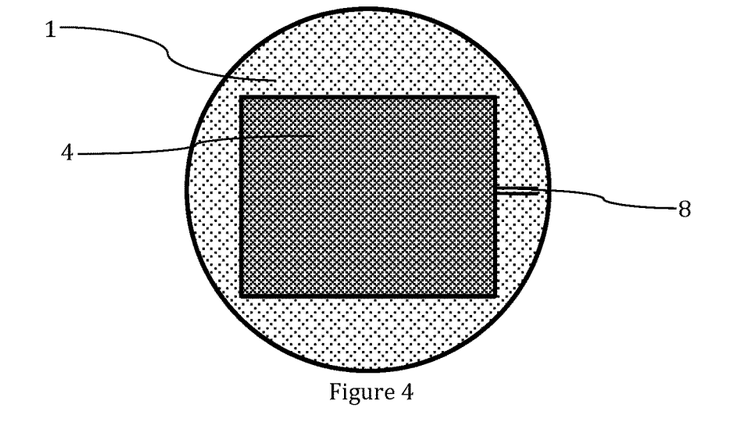

According to a preferential embodiment and as represented in FIG. 4, a part of the electrically conducting track 8 is covered by the protective layer 4.

The electric voltage or current generator 7 is advantageously connected to the electrically conducting track 8 not covered by the protective layer 4.

In such a configuration, the immersion step is facilitated as only the part of the electrically conducting track 8 not covered by the protective layer does not have to be immersed. There is no risk of immersing the first current collector 2 as the latter is protected by the protective layer 4.

According to an alternative embodiment, as the first current collector 2 and second current collector 9 are electrically dissociated, the second current collector 9 cannot be covered by the protective layer 4. The second collector 9 will not participate in the enrichment method as it will be electrically dissociated from the voltage or current generator 7.

Figure 5:
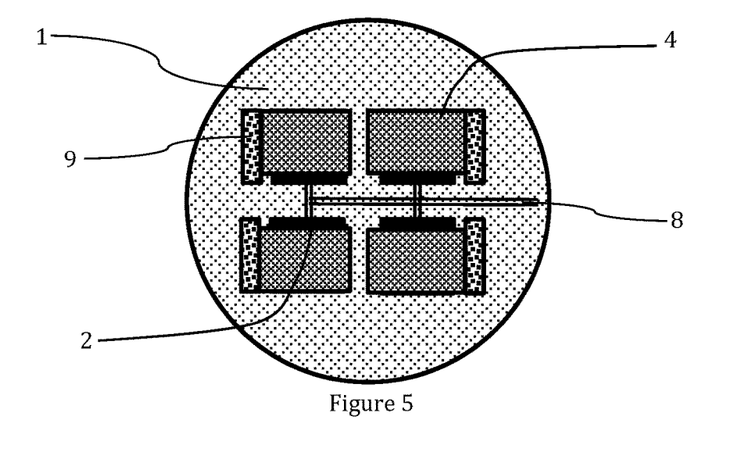

After enrichment of the first electrode 3 with alkaline ionic species, and before deposition of the second electrode 10, the protective layer 4 is etched so as to release at least a part of the first current collector 2 (FIG. 5).

What is meant by released is that it is made accessible, by etching of the protective layer 4. It can be subsequently connected to another element or be covered by another element.

Advantageously, the second current collector 9 is also released.

The first 9 and second current collector 10 are for example made from platinum, chromium, gold, titanium, molybdenum, nickel, or copper.

Figure 6:
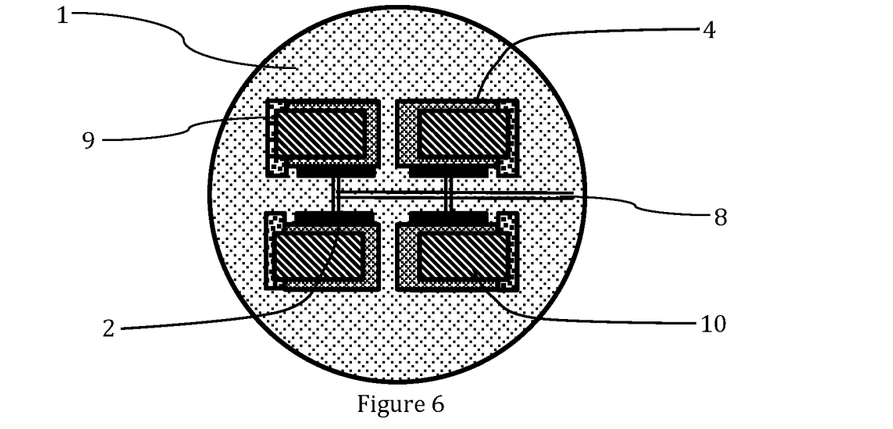

A second electrode 10 is deposited on the protective layer 4 (FIG. 6).

The second electrode 10 is electrically connected to the second current collector 9.

The second electrode 10 is not present in the stack when enrichment of the first electrode 3 is performed.

A large range of material can be used to produce the second electrode.

The second electrode 10 is for example made from silicon, germanium, graphite, indium or tin.

According to a preferential embodiment, the substrate 1 comprises several stacks so as to simultaneously form several enriched first electrodes.

The electrodes are advantageously connected to the same current or voltage generator when the enrichment method is performed.

As represented in FIGS. 3 to 7, in the case of a substrate 1 provided with several stacks, a single protective layer 4 is advantageously used to cover all the stacks. Enrichment of each electrode is performed through this single protective layer 4.

Alternatively, each stack could be covered by its own protective layer.

Figure 7:
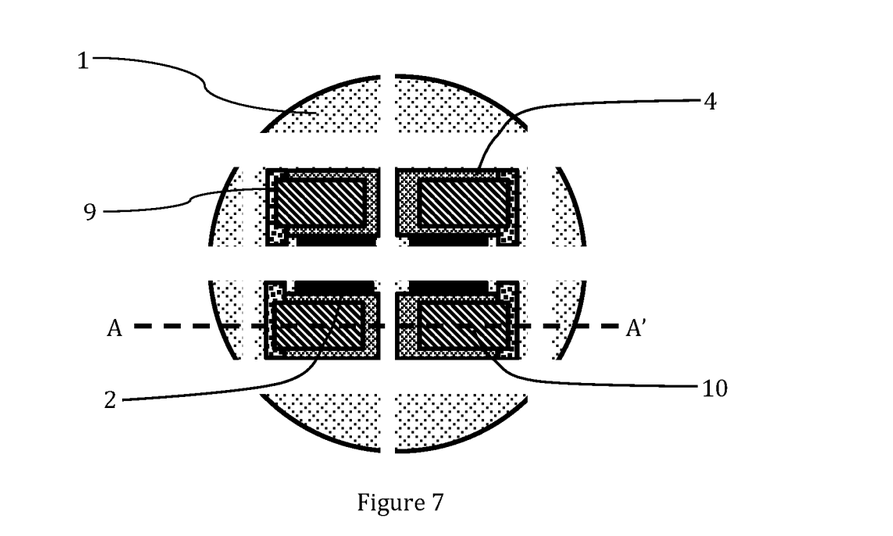

After deposition of a second electrode 10 on each of the stacks, the substrate 1 is advantageously etched or cut so as to separate the different stacks from one another (FIG. 7).

Cutting can be performed by any suitable technique. Preferentially, the substrate 1 is cut by means of a laser.

Preferentially, the substrate 1 is made from glass or from silicon. This substrate can be of any homogenous or heterogeneous type. In the case of a substrate made from electrically conducting material, the substrate 1 is electrically insulated from the electrolytic bath.

Figure 8:
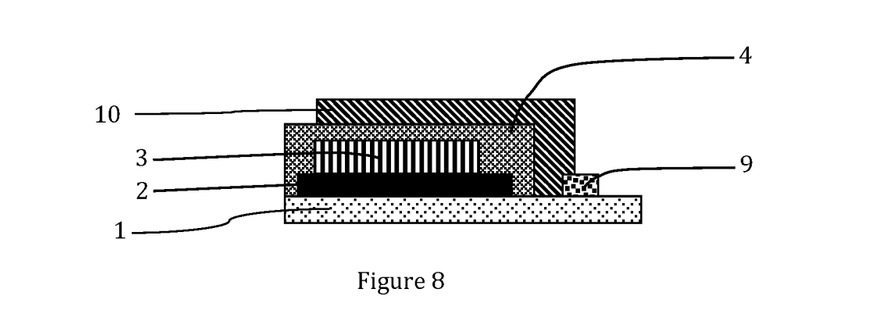
FIG. 8 represents an electrochemical device containing an electrode enriched by means of the method of the invention, in schematic manner and in cross-section.

FIG. 8 represents a microbattery obtained by the method. The battery is represented schematically, in cross-section, along the line AA' of FIG. 7.

In the previously described embodiments, the second current collector 9 is deposited prior to deposition of the second electrode 10.

According to an alternative embodiment, the second current collector 9 is deposited after deposition of the second electrode 10 so as to cover the second electrode 10.

The method will now be described by means of the following example given for illustrative and non-exhaustive example purposes.

In the example, the electrodes of four microbatteries were simultaneously enriched.

The stack is made on a glass substrate of borosilicate type having a thickness of 100 µm.

Titanium anodic and cathodic current collectors with a thickness of 250 nm are formed on a substrate by physical vapor deposition (PVD).

A copper conducting track with a thickness of 200 nm is then deposited by PVD on this substrate. The conducting track is in contact with each cathodic collector of each stack to be formed.

A positive electrode or cathode made from TiOS with a thickness of 1.2 µm is deposited by PVD on each cathodic collector.

The solid electrolyte, LiPON with a thickness of 2 µm, is deposited by PVD so as to cover the whole of the surfaces of the positive electrode layers and cathodic collectors.

Only a part of the copper track is not covered by this solid electrolyte layer.

The substrate provided with the different stacks is immersed in an electrolytic bath.

A counter electrode made from metallic lithium is also immersed in the electrolytic bath. This electrode corresponds to the anode of the enrichment device.

The electrolytic solution can for example be composed of solvents of carbonate type EC, PC, DMC, DEC, etc, and of a lithium salt of $LiPF_6$ type, the latter ensuring a good ionic conductivity of the $Li^+$ ions between the cathode and the anode made from metallic lithium, in addition to being an ionic species source.

A generator of electric voltage or current is connected on the one hand to the part of the copper track not covered by the solid electrolyte and on the other hand to a counter-electrode made from metallic lithium.

A current density of 50 $\mu A/cm^2$ is applied for a period of 1 hour.

The glass substrate, provided with the stack, is taken out of the electrolytic bath. The assembly is rinsed in order to eliminate the residues of electrolytic solution.

The LiPON electrolyte layer is then etched so as to release the contact of the cathodic and anodic collectors.

A silicon negative electrode layer with a thickness of 65 nm is deposited above the solid electrolyte and is in contact with the anodic collector.

Finally, the glass substrate is cut by laser in order to separate each of the microbatteries.

The performances of the microbatteries obtained were tested.

Figure 9:
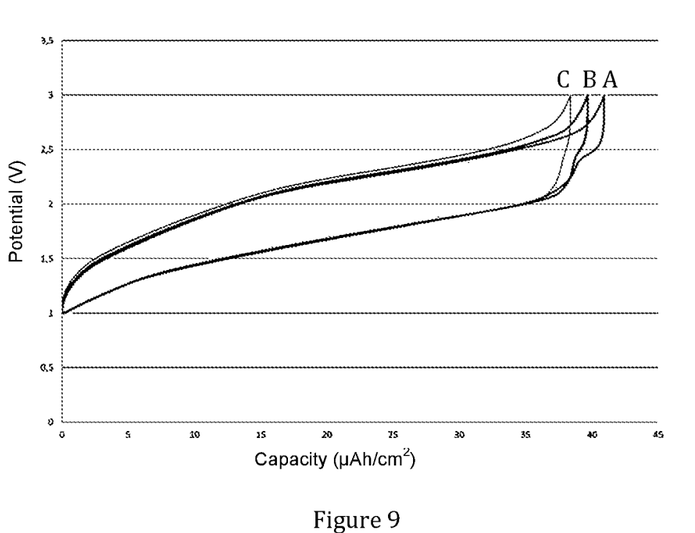
FIG. 9 represents cycling curves for different currents of a microbattery obtained according to the method of the invention.

FIG. 9 represents the variation of the potential at the terminals of the battery versus the state of charge (the capacity) of this battery.

The charge-discharge curves show the perfect functionality of the device for different test current values (10 µA—plot A; 20 µA—plot B; and 40 µA—plot C).

The enrichment method enables a very precise control of the degree of lithiation of an electrode of a thin film electrochemical device.

The quantity of lithium inserted is controlled by the current (or the voltage) applied when the method is performed.

The electrodes enriched by the method present a homogenous lithiation.

Electrochemical devices comprising such an enriched electrode, such as for example a battery, a microbattery or an electrochromic system, present good electrochemical performances.

The electrode enriched with alkaline ionic species can more particularly be used for fabricating lithium batteries in thin layers, and in particular for producing microbatteries designed to be incorporated in fabrication of smart cards, smart tags, real time clock power supplies, implanted medical systems (pacemaker or hearing aids for example). These electrodes can further be used for fabrication of microsystems of physical, chemical or biological type, for fabricating actuators, or microfluidic devices.

Electrochromic or supercapacitor cells in thin layers are further fields of application for such electrodes.

The invention claimed is:

1. A method for performing enrichment of an electrode of an electrochemical device, with an ionic species, said method comprising the following steps:
   providing a substrate provided with at least one stack comprising:
     a first current collector covering at least a part of the substrate,
     a first electrode covering at least a part of the first current collector, the first electrode being in electric contact with the first current collector,
     a protective layer totally covering the first electrode and at least a part of the first current collector, the protective layer being electrically insulating and ionically conducting,
   immersing in an electrolytic solution:
     the substrate provided with the stack,
     a counter-electrode made from conducting material,
     the electrolytic solution comprising at least one salt of the ionic species and/or the counter-electrode comprising said ionic species,
   applying an electric voltage or current, with a voltage or current generator, between the first current collector and the counter-electrode so as to make the ionic species migrate to the first electrode and to enrich the first electrode with the ionic species,
   depositing a second electrode on the protective layer after enrichment of the first electrode with the ionic species.

2. The method according to claim 1, wherein an electrically conducting track is deposited on the substrate, said electrically conducting track being electrically connected to the first current collector,
   wherein the protective layer totally covers the first current collector,
   and wherein the voltage or current generator is connected to the electrically connecting track conducting and to the counter-electrode.

3. The method according to claim 2, wherein a part of the electrically conducting track is covered by the protective layer and wherein the voltage or current generator is connected to the electrically conducting track not covered by the protective layer.

4. The method according to claim 2, wherein the electrically conducting track is made from copper or from titanium.

5. The method according to claim 1, wherein the second electrode is made from silicon, germanium, graphite, indium or tin.

6. The method according to claim 1, wherein the protective layer is etched, before deposition of the second electrode, so as to release at least a part of the first current collector.

7. The method according to claim 1, wherein the ionic species is an alkaline ionic species, such as lithium, sodium or potassium.

8. The method according to claim 1, wherein the ionic species is a non-alkaline ionic species, such as copper.

9. The method according to claim 1, wherein the protective layer is made from LIPON or from $Li_2S$—$P_2S_5$.

10. The method according to claim 1, wherein the first electrode is made from TiOS, silicon, germanium, graphite, indium, tin or $V_2O_5$.

11. The method according to claim 1, wherein the electrolytic solution comprises at least one carbonate solvent and at least one salt of the ionic species.

12. The method according to claim 1, wherein the substrate is made from glass or from silicon.

13. The method according to claim 1, wherein the substrate comprises several stacks so as to simultaneously form several enriched first electrodes.

14. The method according to claim 13, wherein said first electrodes are connected to the same current or voltage generator during the enrichment method.

15. An enriched electrode able to be obtained by the method according to claim 1.

16. A battery or microbattery comprising an enriched electrode according to claim 15.

17. An electrochromic system comprising an enriched electrode according to claim 15.

* * * * *